United States Patent [19]
Solomon et al.

[11] Patent Number: 6,151,659
[45] Date of Patent: Nov. 21, 2000

[54] DISTRIBUTED RAID STORAGE SYSTEM

[75] Inventors: Robert C. Solomon, Kensington, N.H.; Jeffrey A. Blakeslee, Shrewsbury, Mass.

[73] Assignee: EMC Corporation, Hopkinton, Mass.

[21] Appl. No.: 08/996,444

[22] Filed: Dec. 22, 1997

[51] Int. Cl.[7] .................................................. G06F 12/02
[52] U.S. Cl. ........................ 711/114; 711/148; 711/152; 710/200; 714/6
[58] Field of Search .................... 711/114, 152, 711/148; 714/6; 710/200

[56] References Cited

U.S. PATENT DOCUMENTS

| | | | |
|---|---|---|---|
| 4,984,153 | 1/1991 | Kregness et al. | 711/152 |
| 5,301,290 | 4/1994 | Tetzlaff et al. | 711/142 |
| 5,305,326 | 4/1994 | Solomon et al. | 371/11.1 |
| 5,339,427 | 8/1994 | Elko et al. | 709/103 |
| 5,371,743 | 12/1994 | DeYesso et al. | 371/8.1 |
| 5,452,444 | 9/1995 | Solomon et al. | 395/182.04 |
| 5,537,567 | 7/1996 | Galbraith et al. | 395/441 |
| 5,617,425 | 4/1997 | Anderson | 371/10.2 |
| 5,633,999 | 5/1997 | Clowes et al. | 395/182.04 |
| 5,666,511 | 9/1997 | Suganuma et al. | 711/114 |
| 5,678,026 | 10/1997 | Vartti et al. | 711/152 |
| 5,933,824 | 8/1999 | DeKoning et al. | 707/8 |

FOREIGN PATENT DOCUMENTS

| | | |
|---|---|---|
| 0727750A2 | 8/1996 | European Pat. Off. . |
| 0 769 744 A2 | 4/1997 | European Pat. Off. . |
| WO 91/13399 | 9/1991 | WIPO . |
| WO 95/13583 | 5/1995 | WIPO . |
| WO 98/28684 | 7/1998 | WIPO . |

OTHER PUBLICATIONS

Ciprico Annual Report 1995.
CIPRICO Disk Arrays, Product Description, 1995.
CLARiiON's Data Integrity Difference, Steve Todd, Nov. 28, 1995.
HP Disk Array with AutoRAID for HP 9000 Servers and Workstations, Product Summary.
Swift: A Storage Architecture for Large Objects, Luis–Felipe Cabrera et al., Oct. 12, 1990.
Swift: Using Distributed Disk Striping to Provide High I/O Data Rates, Luis–Felipe Cabrera et al.
Swift/RAID: A Distributed RAID System, Long et al.
The Swift/RAID Distributed Transaction Driver, Montague, Jan. 1, 1993.
The TickerTAIP parallel RAID architecture, Cao et al., Dec., 1992.
RAID–II: A Scalable Storage Architecture for High–Bandwidth Network File Service, Lee et al.
Performance Modeling and Analysis of Disk Arrays, Edward Lee.
An Analytic Performance Model of Disk Arrays and its Application, Lee et al.
Performance Measurements of the First RAID Prototype, Cervenak, May 17, 1990.
HP Disk Array with AutoRAID Models 12 and 12H; HP 9000 Enterprise Servers and Workstations.
CLARiiON RABCON '96, Fibre Arrays Meeting the Challenge, Brian Bailey.

*Primary Examiner*—Hiep T. Nguyen
*Attorney, Agent, or Firm*—Bromberg & Sunstein LLP

[57] ABSTRACT

A data storage system has at least three data storage disks and a plurality of processing nodes in communication with the data storage disks. Each of the processing nodes shares access to the data storage disks, and each of the processing nodes includes a distributed lock manager that allows or denies access to selected stripes of data storage sectors on any of the data storage disks. Each of the processing nodes includes an interface to a private communication link to a single one of a plurality of host operating systems.

24 Claims, 6 Drawing Sheets

FIG. 6

DISTRIBUTED RAID STORAGE SYSTEM

TECHNICAL FIELD

This invention relates to a redundant array of independent disks (RAID) system in which multiple host operating systems share access to the disk drives.

BACKGROUND OF THE INVENTION

RAID technology provides high availability to data, while allowing data integrity even though a disk drive may fail. When there is a failure, the data located on the failed drive must now be re-created using data from the surviving drives. A common RAID configuration is several hard disk drives, where data is written in a "stripe" across the drives, consisting of corresponding data sectors on each drive, in which one of the data sectors stores parity data for the other data sectors in the stripe. Typically, data access processing nodes, e.g., storage processors, are assigned to groups of hard drives so that data access may be coordinated and/or controlled by the processing node. If one of the drives suffers a failure rendering its portion of a stripe unaccessible, the lost data is reconstructed from the other drives via computation methods well known in the art. In configurations having storage processors, such reconstruction may become transparent to the affected host operating system.

In some more complex RAID implementations, dual processing nodes are utilized to give redundancy to the data access. Such a system can easily recover from processor failure. Consequently, prior art methods have explored having more than one processing node accessing RAID arrays. However, these prior art methods usually require that the arrays be accessed in a nonshared state. That is, generally, disk arrays are owned by one or the other of the processing nodes. Ownership may be transferred from one processing node to the other in a failover condition, for example, but at any given time it is known which processing node owns a given disk array.

It is often desirable to provide a host operating system with access to numerous disk arrays. When a host operating system is connected via a private communication link to a processing node, it will only have access to the disk arrays owned by that processing node. The processing node may be housed in a computer with the host operating system or may be a host bus adapter. When processing nodes of this type are used, adding a host to the system requires designating disk arrays for ownership by the new node. The new host cannot gain access to disk arrays while they are owned by the processing nodes of other hosts. One method of increasing the host's access to disk arrays is to provide it with additional private links to additional processing nodes. Another method often used with storage processors as the nodes is to provide a bus wherein multiple hosts may communicate with any of a plurality of processing nodes. This method is used in the Hewlett Packard AutoRaid product. This product houses two storage processors both of which may be accessed on a communication bus by hosts connected to the communication bus. AutoRaid also redundantly gives the two storage processors shared access to the disk arrays. With storage processors, as in AutoRaid, it is easy to add hosts by connecting them onto the bus to the storage processors. The hosts have access to either storage processor and, in AutoRaid, the storage processor has shared access to any of the disk arrays.

SUMMARY OF THE INVENTION

A preferred embodiment allows a host operating system to be connected through a private communication link to a processing node connected to RAID disk arrays shared with other hosts and to provide the host operating system with access to substantially any of the connected RAID disk arrays.

The system of an embodiment of the invention has a plurality of data storage disks. Each of the disks has a plurality of data storage sectors wherein the data storage disks store data according to a protocol that forms stripes. Each stripe includes a plurality of data storage sectors each located on a different data storage disk. One of the data storage sectors in the stripe stores parity data. A plurality of processing nodes are in communication with the data storage disks, each advantageously sharing access to the data storage disks. Each processing node interfaces with a private communication link to a host operating system. The processing nodes use lock management to arbitrate access to each stripe of data storage sectors. Acquiring a lock associated with a stripe may require awaiting the release of a lock on the stripe imposed by a different processing node. In a further embodiment, the processing nodes may be host-bus adapters. Hosts advantageously share access to the disk drive arrays even though connected through a private communication link to the processing node.

In an embodiment of the invention, there may be a dual loop Fibre Channel connecting the data storage disks and processing nodes. According to another embodiment, the data storage disks may be programmable XOR drives for facilitating the computation of parity data. Each stripe has a parity sector, while the remaining sectors in the stripe store data. Note that parity may be rotated across the drives, to avoid making one of the disk drives a parity drive in its entirety.

Embodiments of the invention advantageously give hosts shared access to multiple data drives implementing RAID data storage. Storage processors are not required. Rather, access to the disks may be provided through private communication links to processing nodes according to embodiments of the invention. The data storage system of embodiments of the invention may be easily expanded to add a host with an accompanying private processing node to an existing system. Other objects and advantages of the invention will become apparent during the following description of the presently preferred embodiments of the invention, taken in conjunction with the drawings.

DETAILED DESCRIPTION OF PREFERRED EMBODIMENTS

In a preferred embodiment, a RAID 5 (Rotating Parity Array) configuration is implemented with striping across the drives. It is understood that the present invention is applicable to other RAID configurations and that RAID 5 is used by means of example only. As used herein, the phrase "distributed RAID" means a configuration where multiple disk drives storing data according to a RAID algorithm are available over a network to a plurality of processing nodes, each sharing direct access to the disk drives. As used herein, "processing node" means a unit including a processor and memory arranged so as to be in communication with the disk drives of a disk array and in communication with other processing nodes.

Figure 1A:
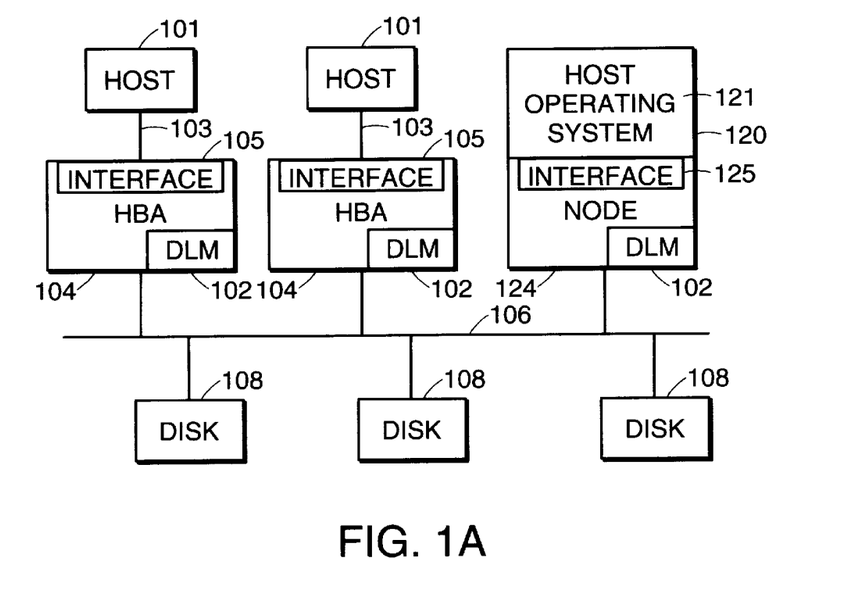
FIG. 1A is a block diagram of a generic distributed RAID environment according to a preferred embodiment of the invention.

Referring now to FIG. 1A, the processing nodes may be host bus adapters (HBA) 104 or may be incorporated into a computer 120. The processing nodes are each in private communication with one host operating system. For the host bus adapters 104, they access a private bus 103 to a host computer 101. While a host could conceivably access more than one host bus adapter, each host bus adapter 104 is in communication with only one host 101. The host bus adapters are shown with a bus interface 105 for interfacing with the private bus to the host 101. For the computers 120, a private communication link between the processing node 124 and the host operating system 121 is internal. An internal bus interface 125 in the node regulates communications between the node and the host.

Also shown are the disk drives 108 for forming RAID arrays. The disk drives 108 are in communication with each other and the processing nodes over the network 106. As the present invention provides for shared access by all processing nodes to all disk arrays, the arrays are not "owned" by any particular processing node. Thus, the network may accommodate two or more processing nodes. The processing nodes are in communication with each other. This may be over the network 106 that communicates with the disk drives 108 or may be over a separate bus or buses. The particular network 106 implementation may be any of a number of available implementations so long as the network provides sufficient bandwidth for speedy access to the disk drives.

In a preferred embodiment, the storage surface of each of the disk drives 108 is divided into many data storage sectors. The particular arrangement of sectors depends upon how the drive was initially formatted for use, and the particular sector arrangement is immaterial. The drives are written to with a RAID protocol that distributes data writes across all drives forming a particular RAID group. The distribution is one in which the data is written in stripes across the drives, where a portion of the stripe is contained in at least one sector from each drive of the group. In a preferred embodiment, one of the storage sectors within a given stripe is utilized to store parity information for the information written within the other sectors forming the data stripe. If one of the disk drives within the RAID group suffers a failure, then this parity data and the data of the functioning disk drives may be used to reconstruct the data that was contained on the failed drive. In a preferred embodiment, there is no dedicated parity drive. All drives contain data for some stripes and parity for others. Read operations may take place concurrently on every drive in the array. In addition, when write operations access a single data drive (plus the parity drive), since parity information may be written on different drives, write operations may happen concurrently.

Access to the drives is through processing nodes, i.e., host bus adapters 104 or nodes 124, in communication with the data storage disks. Each processing node is in communication with all disk drives 108, rather than each processing node being assigned sole access to a particular grouping of disk drives. To prevent problems with this multiple access, the processing nodes implement a lock management system. While lock management may be performed in accordance with conventional lock management schemes, the presently preferred embodiment uses a distributed lock manager 102. A distributed lock manager runs on each processing node. This manager is responsible for arbitrating access to the data stripes. Thus the manager ensures there is no contention between processors for access to different portions of the same disk drive, and if there is a conflict, the manager coordinates the access so as to insure consistency of the parity data with the write data. In a preferred embodiment, the management is achieved through setting and releasing locks of various types depending on the disk access desired.

Figure 1B:
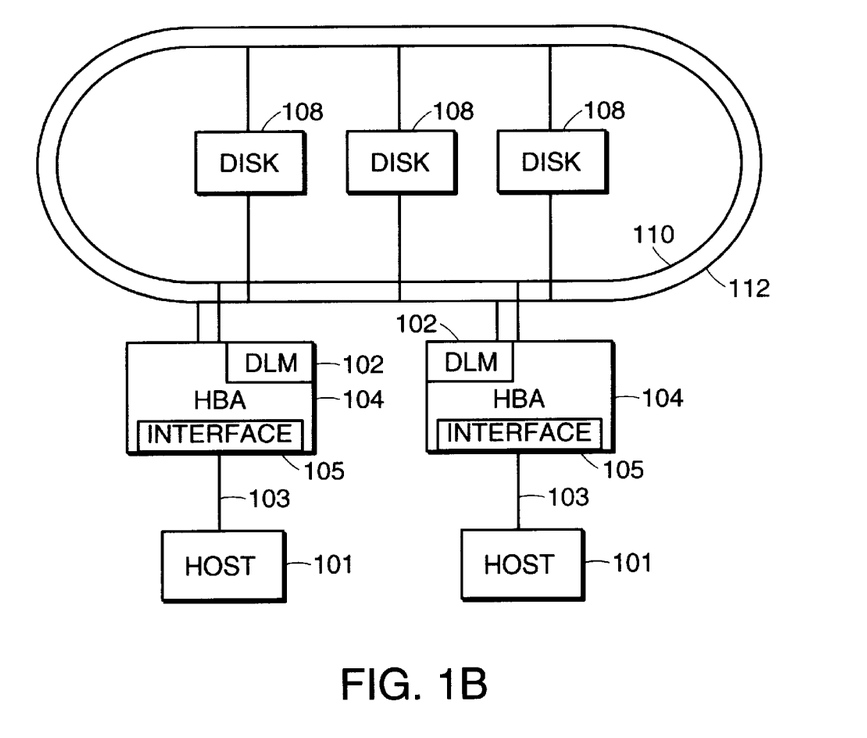
FIG. 1B is a block diagram of a preferred embodiment of the FIG. 1A distributed RAID environment.

FIG. 1B is a flowchart of a preferred distributed RAID environment showing the use of a dual-loop communication pathway to the disks. As with the FIG. 1A configuration, shown are at least two distributed lock managers 102b, at least two processing nodes in private communication with hosts 101, and network communication pathways 110, 112. In this preferred embodiment, a dual Fibre Channel loop is utilized as the network communication pathways 110, 112. Fibre channel is an industry-standard interface adopted by the American National Standards Institute. It is a system-to-system or system-to-subsystem interconnection architecture that may use optical cable between systems in an arbitrated loop, point-to-point or switch configuration. There are many defined communication protocols, one such being the fibre channel arbitrated loop (FC-AL), which allows for an interface for directly connecting a disk drive to the fibre channel loop. In a preferred embodiment, the disk drive may also support onboard XOR calculations, thus freeing the host computer and processors from having to compute the parity information. Such XOR drives are described in U.S. Pat. No. 5,617,425 (Anderson), the fall disclosure of which is hereby incorporated herein by reference. The XOR drives may be instructed to perform an XOR write as long as they are also given configuration information, indicating which drive contains the parity data. The system of the present invention may be implemented irrespective of whether the drives within the array support the automatic XOR calculations. Depending on the RAID implementation, parity for all stripes may be stored upon a single drive or the drive containing parity may vary from stripe to stripe.

The lock management may assert several different types of locks and requests to coordinate drive access. Each lock must extend at least over an entire stripe and preferably encompasses only the stripe or stripes affected by the data access. One type of request is the NULL request. When asserted, no access is granted. This mode is the default mode when a lock is initially accessed. It is a nonblocking request in that other lock requests are granted without restriction. Holding a lock in NULL mode does not block other lock accesses, and is equivalent to releasing a lock and maintaining a reference to the lock object for subsequent lock requests.

One type of lock is an Unprotected Read (URead). The terms "unprotected" and "shared" are used interchangeably herein. Whereas a protected lock blocks all write access requests, an unprotected or shared lock is one that permits other unprotected or shared write requests to proceed. When an unprotected read lock is asserted, access to read the desired resource (here, a stripe) is granted, and other requests to read or write the stripe are permitted. Only a request for exclusive access to the stripe is blocked. This mode is called unprotected since it does not prevent other read or write requests.

Another lock is an Unprotected Write (UWrite). When this lock is asserted, other requests for unprotected read or write accesses to a stripe are granted. Protected read or write accesses, as well as exclusive access requests are blocked.

Another lock is a Protected Read (PRead). When this lock is asserted, access to read the stripe is granted. Other unprotected or protected requests to read the stripe are granted, but unprotected or protected requests to write to the stripe, and exclusive access requests, are blocked. This lock is called protected since it prevents any write access while the lock is asserted. Another lock is a Protected Write (PWrite). When this lock is asserted, access to write the resource is granted. Other requests for unprotected read access are granted, but all other requests are blocked. This lock is called protected since it prevents any write access while the lock is asserted.

The following table illustrates the interaction among the various locking modes, when a lock is requested while another lock is currently being asserted:

|           | NULL  | URead | UWrite | PRead | PWrite | Exclusive |
|-----------|-------|-------|--------|-------|--------|-----------|
| NULL      | Grant | Grant | Grant  | Grant | Grant  | Grant     |
| URead     | Grant | Grant | Grant  | Grant | Grant  | Block     |
| UWrite    | Grant | Grant | Grant  | Block | Block  | Block     |
| PRead     | Grant | Grant | Block  | Grant | Block  | Block     |
| PWrite    | Grant | Grant | Block  | Block | Block  | Block     |
| Exclusive | Grant | Block | Block  | Block | Block  | Block     |

Note that using the lock manager to assert locks for arbitrating access to disk drives, allows the standard ability of having multiple readers access the same drives in addition to allowing multiple concurrent writers through assertion of a combination of the URead, and PWrite locking modes. This is possible when the locks are used to synchronize drive access so as to ensure that readers and writers see consistent (i.e., always old or always new) information on the drives.

RAID operations are modified in accord with preferred embodiments of the invention to accommodate shared access to the lock manager. FIGS. 2 through 6 show five representative operations described herein; these include: writing to drives having programmable XOR support, writing to drives which do not support programmable XOR calculations, and reading, rebuilding, and verifying either type of drive. Each of these situations are respectively described hereinbelow with an accompanying figure. Other operations are similarly modified as necessary to complete an implementation of the present invention.

Figure 2:
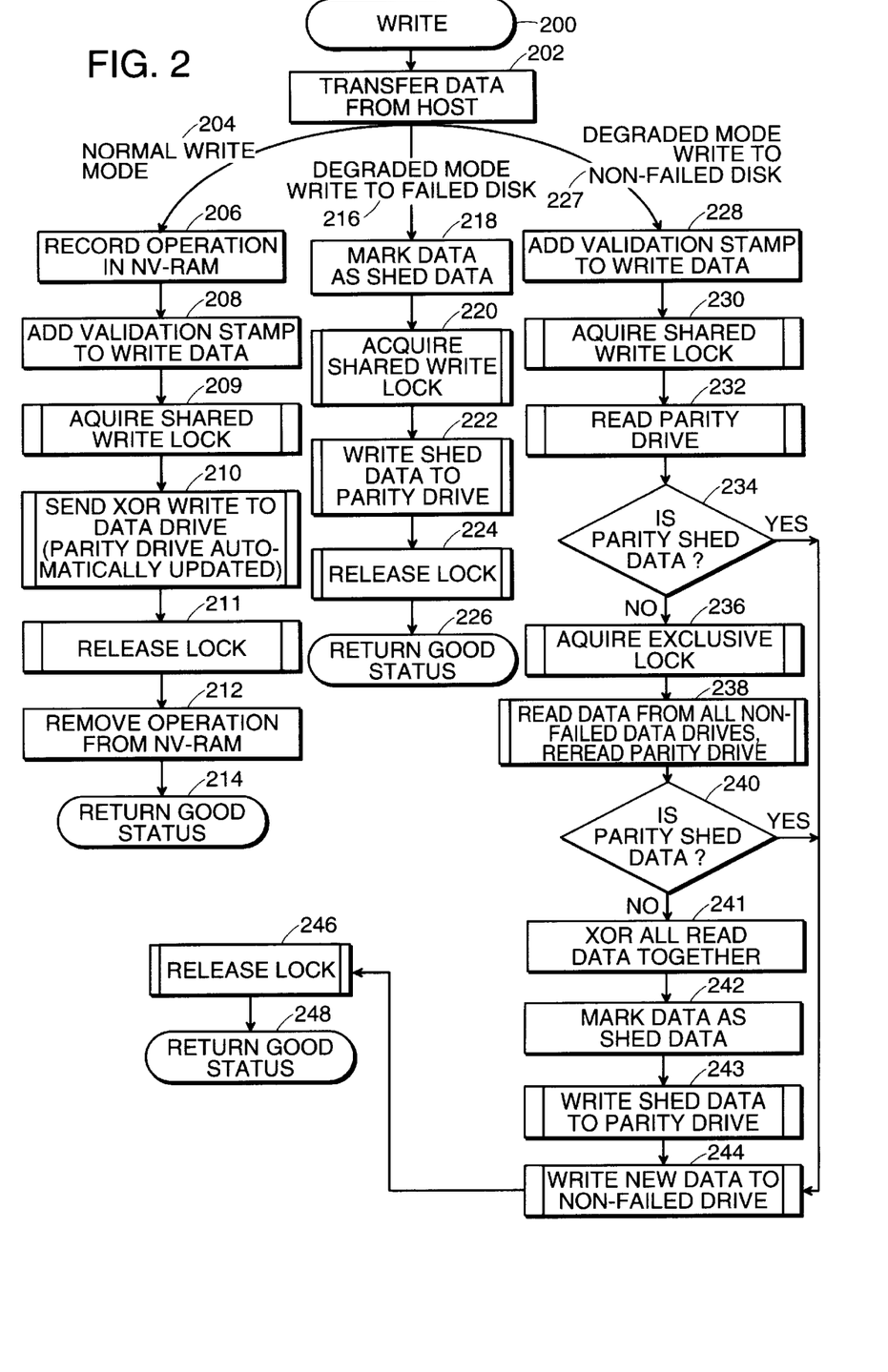
FIG. 2 is a flowchart of a write transaction to XOR drives for use in an embodiment of the present invention.

FIG. 2 is a flowchart of a write transaction to XOR drives. An XOR drive is one in which the RAID XOR calculations are performed automatically. That is, typically, when performing a disk-write to a RAID group, in addition to the data to be written, the parity (XOR) data needs to be calculated and written out. Recently, drives having built-in XOR circuitry have become available. With these drives, one may select the data/parity drive configuration, and when data is written out to disk, the disk drives automatically calculate and write out the XOR partial product data to the parity drive, and the parity drive completes the XOR calculation of the new parity and writes the data.

At the start of the write transaction 200, the data to be written is transferred from the host 202 over the private communication link to the processing node. During a normal write mode 204, the location and extent of the write operation is recorded 206 in NV-RAM to allow for faster fault recovery as described hereinabove. Then a validation stamp is computed for the data 208. In the RAID 5 context (hereinafter simply RAID), a longitudinal redundancy checking (LRC) is implemented to assure the integrity of data being written from a processor to a disk, and being read back from the disk on a host read request. To implement LRC, a portion of each disk sector is used to store a calculated LRC code for each data sector within the stripe. For the purposes of this specification and claims that follow, this LRC code is defined to be the "validation stamp." A method for creating validation stamps is described in co-pending U.S. patent application Ser. No. 08/805,144, filed Feb. 24, 1997, assigned to the same assignee as the present application and disclosure of which is hereby incorporated by reference herein. After computing the stamp, a shared write lock is acquired 209. Since XOR drives are being used in the FIG. 1 implementation of a distributed RAID environment, the next step is to simply send an XOR write request 210 to the data drive, and the parity drive is automatically updated with the proper parity information. After the write request, and subsequent parity write, the write lock may be released 211, and the write operation removed from NV-RAM 212. A good status signal is returned 214 to the host to indicate write success.

During a degraded mode write to a failed disk 216, which occurs when a write is attempted to a failed disk, the data to be written is flagged as shed data 218. A shared write lock is requested 220. As the desired drive is malfunctioning or for some other reason has been taken offline, the shed data is written to the corresponding parity sectors 222, and when complete, the lock is then released 224. A good status signal is returned 226 to indicate write success.

During a degraded mode write to a nonfailed disk 227, which occurs when a data drive has failed, but the failed drive is not being presently written to, a validation stamp is added to the data 228, and a shared write lock is requested 230. After acquisition of the lock, the corresponding parity sectors are read 232, and a test is made 234 to determine if the read data is shed data. Recall that when a data drive fails, the corresponding portion of the data stripe contained on the parity drive is used to store the data that would have been written to the failed data drive. This data storage is flagged as such. If the test 234 returns negative, an exclusive lock is requested 236, and the desired data is read from all nonfailed data drives, and the parity data is reread 238. Then a test is once again made to determine if the parity drive contains shed data 240. If the test again returns negative, then all read data (including parity data) is XOR'd together 241, and the data is marked as shed data 242.

Note that it is presumed in PIG. 2 that the drive containing the parity data is operating correctly; were the drive to be inoperative, then program control would go from step 234 to step 244. That is, for a failed parity drive, then it is treated as if containing shed data, and control flow continues at step 244.

The shed data is then written to the parity drive 243, and new data is then written to the nonfailed drive 244. Then the exclusive lock is released 246 and a good status signal is returned 248 to indicate write success. If the first 234 or second 240 shed data test returned positive, then the new data is written to the nonfailed drive 244, the exclusive lock (or shared write) is released 246, and a good status signal is returned 248 to indicate write success.

Figure 3:
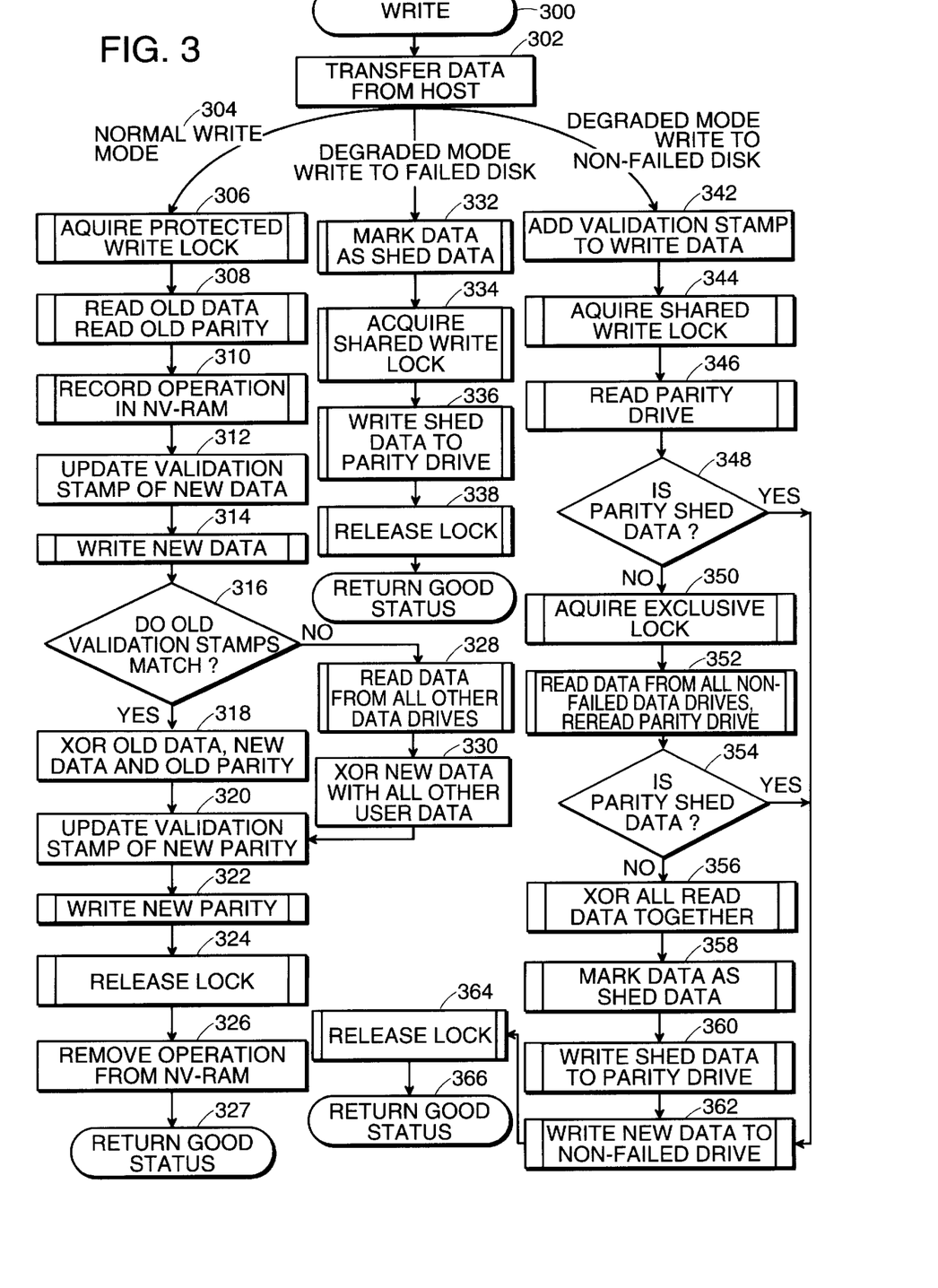
FIG. 3 is a flowchart of a write transaction to nonXOR drives for use in an embodiment of the present invention.

FIG. 3 is a flowchart of a write transaction to nonXOR drives. At the start of the write transaction 300, the data to be written is transferred from the host 302 over the private communication link to the processing node. During a normal write mode 304, when all drives are functional, a protected write lock is acquired 306, and then the old data and old parity data is read 308. The location and extent of the impending write operation is then stored in NVRAM 310, and the validation stamp for the new data is updated 312. The new data is written 314 and the old validation stamp of the parity data is compared 316 with the old validation stamp of the old data. If the validations match, the old data, new data and old parity are XOR'd together 318, and the validation stamp for the new parity is updated to reflect the new data 320. The new parity is then written 322 and the lock is released 324. The operation is then removed from NVRAM 326 and a good status signal is returned 327 to indicate write success. If the validations did not match, the old data is read from all of the other data drives 328, and XOR'd 330 with the new data to be written. The validation stamp for the new parity is updated 320. The new parity is then written 322 and the lock is released 324. The operation is then removed from NVRAM 326 and a good status signal is returned 326 to the host to indicate write success.

During degraded mode write to a failed disk, after the transfer from the host 302, the data to be written is marked as shed data 332. A shared write lock is acquired 334 and the shed data is written to the parity drive 336. The lock is then released 338 and a good status signal is returned 340 to indicate write success.

During degraded mode write to a nonfailed disk, after the transfer from the host 302, a validation stamp is added to the data to be written 342. Then a shared write lock is acquired 344 and the corresponding parity sectors are read 346. This data is then checked 348 to see if the parity data is flagged as shed data. If not shed data, an exclusive lock is acquired 350, all nonfailed drives are read and the parity data is reread 352. A second check is made to determine if the parity drive contains shed data 354. If the test returns negative, all read data (including parity data) is XOR'd together 356, and the data to be written is flagged as shed data 358. This shed data is then written to the parity disk 360, and the new write data is written to the nonfailed drives 362. The lock is then released 364 and a good status signal is returned 366 to indicate write success. If the first 348 or second 354 shed data tests returned positive, then the new write data is written to the nonfailed drives 362, the lock released 364, and good status signal is returned 366 to indicate write success. (Note that the sequence of steps is similar to that discussed hereinabove for degraded mode writing to a nonfailed disk 227.)

Figure 4:
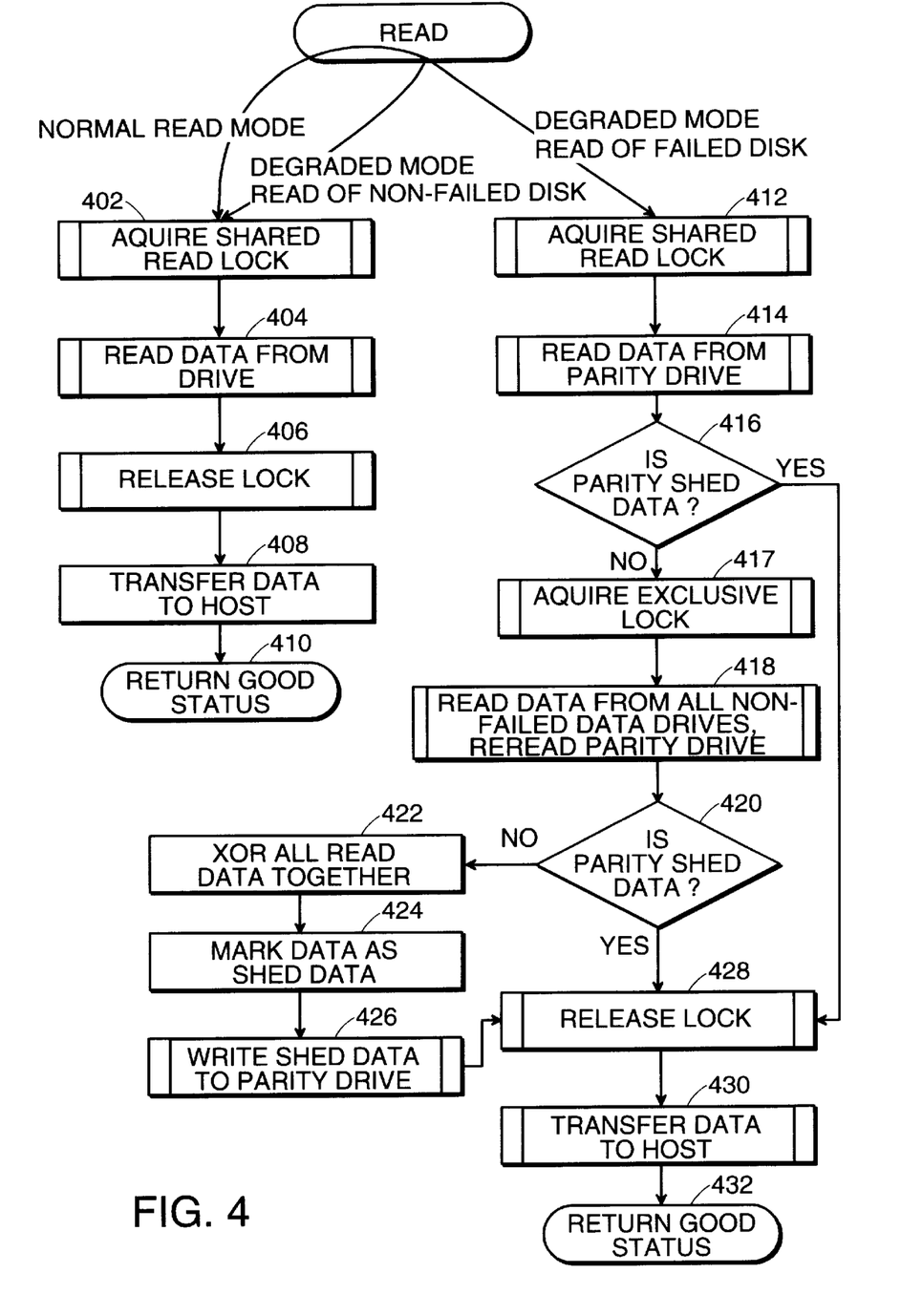
FIG. 4 is a flowchart of a read transaction for use in an embodiment of the present invention.

FIG. 4 is a flowchart of a read transaction. During normal or degraded mode read from a nonfailed disk, a shared read lock a acquired 402, and the data is then read from the drive 404. The lock is then released 406, and the data transferred back to the host 408. A good status signal is returned 410 to indicate read success.

During degraded mode read from a failed disk, a shared read lock is acquired 412, and the corresponding parity sectors are read from the parity drive 414. This data is then tested 416 to see if it is shed data. If not, then an exclusive lock is acquired 417, and the stripe data is read from the nonfailed drives, and the parity sectors are reread 418. A second test is made to determine whether the parity data contains shed data 420. If the second shed data test returns negative, then all read data, including parity data, is XOR'd together 422, marked as shed data 424, and written to the parity drive 426. The lock is then released 428, the data transferred to the host 430, and a good status signal returned 432 to indicate read success. If the first 416 or second 420 shed data tests returned positive, the lock is released 428, the data transferred to the host 430, and a good status signal returned 432 to indicate read success.

Figure 5:
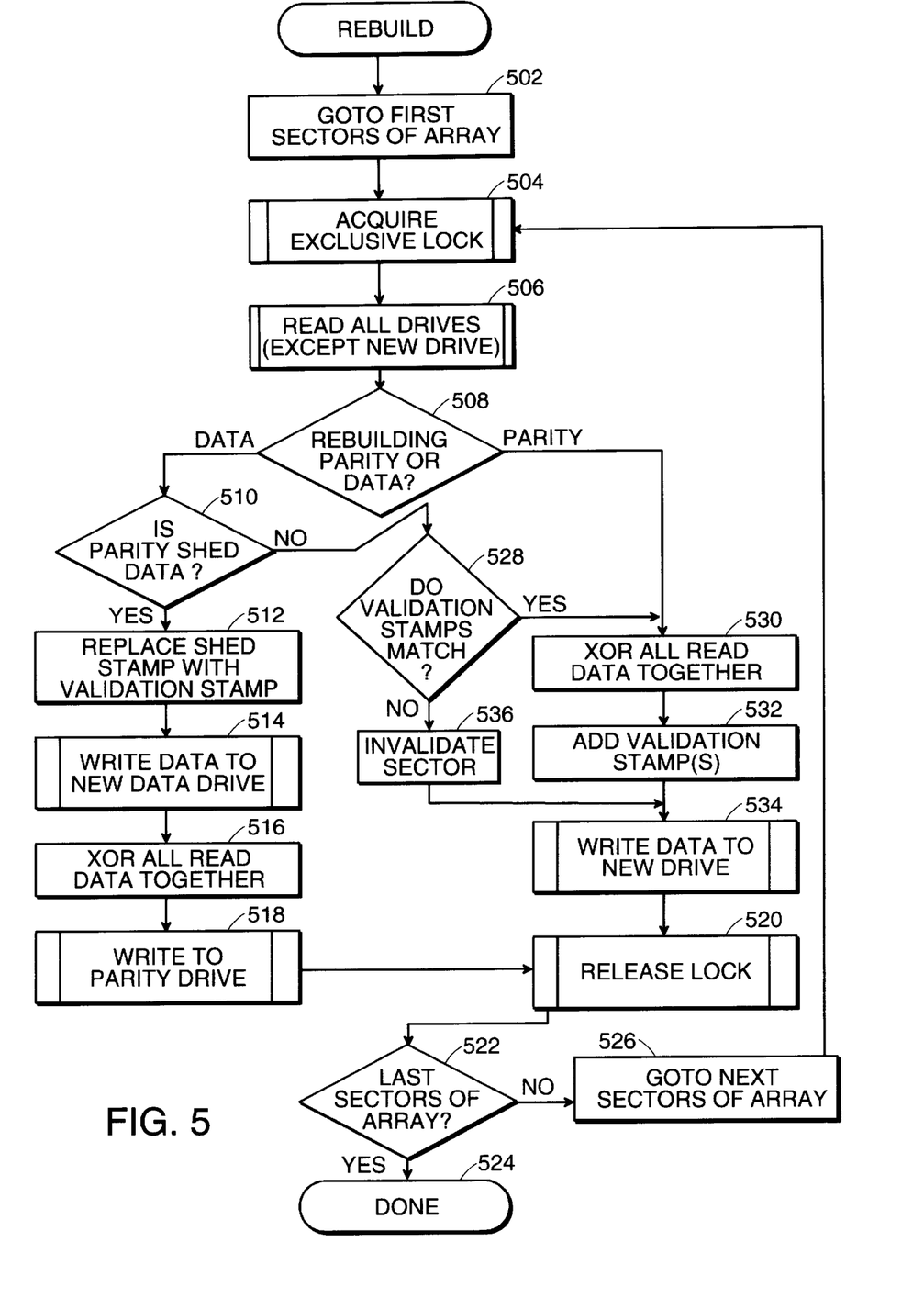
FIG. 5 is a flowchart of a rebuild transaction for use in an embodiment of the present invention.

FIG. 5 is a flowchart of a rebuild transaction. A rebuild is performed after a failed drive is replaced, and in a preferred embodiment, performs the rebuild transparently in the background. The rebuild begins with the first sectors in the disk array 502, and progresses through the last. Recall that the aggregate of all corresponding sectors for each drive comprises a stripe of data written across those drives. During rebuild, an exclusive lock is acquired 504 for each sector of the stripe being rebuilt. The data is read from all drives except for the new drive 506. A test is made to determine whether the data being rebuilt is data drive data or parity drive data 508. If performing a data drive rebuild, a check is performed to determine whether the parity data contains shed data 510. Recall that in a preferred embodiment, when a data drive fails, the data is written into the corresponding parity sectors for that stripe, and the parity sector is marked accordingly. If the parity data is shed data, then the parity drive's shed data marker is replaced with the data validation stamp 512. This data is written to the new drive 514. The data from each corresponding sector of the data drives is then XOR'd together 516, a validation stamp is computed for the parity data, and this value written to the parity drive 518. The lock is then released 520, and a test performed 522 to determine whether we have processed the last sector of the disk array. If the test returns positive, then the rebuild is complete and the process is done 524. If the test returns negative, then the rebuild process proceeds with the next sector(s) of the disk array 526 and the exclusive lock is re-obtained 504 for the rebuild of the present stripe. If the parity data does not contain shed data 510, then a test is made to determine whether the validation stamps match 528. If the test returns positive, then the sector data for all drives is XOR'd together 530, and the validation stamp or stamps (if more than one is required) are added 532. The data for the new drive is then written out 534, the lock released 520, and the test 522 is performed to determine whether we have processed the last sector of the disk array, or if processing shall continue with a new exclusive lock 504. If the validation stamps did not match 528, then the sector is marked invalid 536, to indicate that the missing data cannot be calculated correctly, thus making the data unavailable rather than propagating incorrect data. The invalid sector(s) is written to the new drive 534, and the lock is released 520. A test is then performed 522 to determine whether we have processed the last sector of the disk array, or if processing shall continue with a new exclusive lock 504.

If the initial test 508 indicates that parity sectors are being rebuilt, all read data is XOR'd together 530, and the validation stamp(s) are added 532. The resulting parity data for the new drive is then written out 534, the lock released 520, and the test 522 is performed to determine whether we have processed the last sector of the disk array, or if processing shall continue with a new exclusive lock 504.

Figure 6:
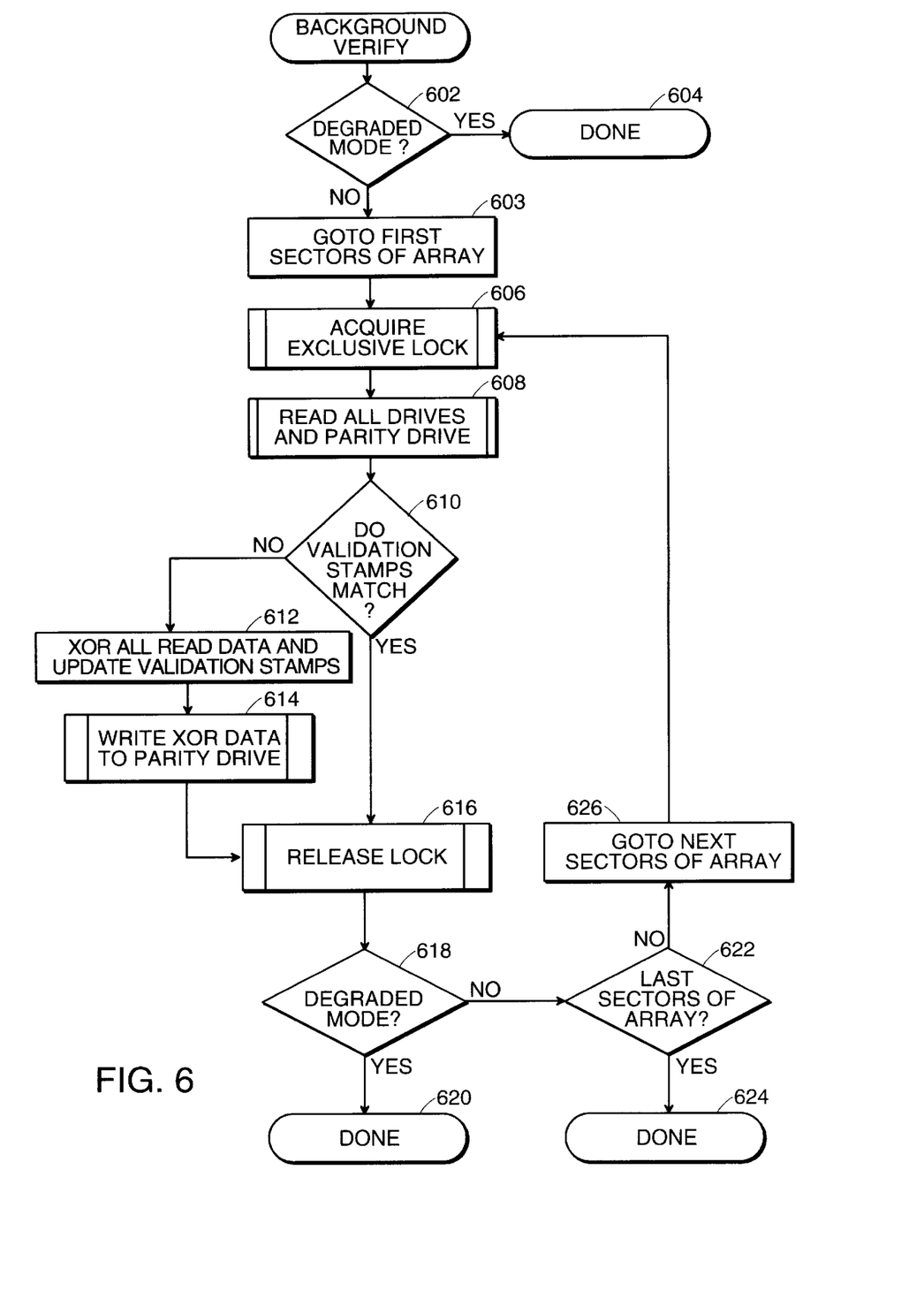
FIG. 6 is a flowchart of a background verify transaction for use in an embodiment of the present invention.

FIG. 6 is a flowchart of a background verify transaction. An initial test 602 is performed to determine if the disk array is performing in degraded mode. If yes, then processing halts 604. If not a degraded mode, then processing continues with the first sector for the disk array 603, which in a preferred embodiment equates to a particular RAID striping across those disks. An exclusive lock is acquired 606 and all drives and parity drive are read 608 (i.e., the current stripe is read). The validation stamps are then compared 610, and if they do not match, all read data (not including the parity data) is XOR'd together and the validation stamps are updated 612. The XOR value (the new parity data) is then written to the parity drive 614, the lock released 616, and degraded mode checked again 618. If degraded mode returns positive, then processing terminates 620. If the mode check returns negative, then a check is made 622 to determine if the last sector of the drives has been checked. If so, then processing terminates 624. If not, then processing continues with the next sector of the array 626 (the next stripe), and a new exclusive lock is obtained 606 so as to repeat the verification processing. If the validation stamps did match 610, then the lock is released 616, and degraded mode checked again 618. If degraded mode returns positive, then processing terminates 620. If negative, processing of the last sector is checked 622 to determine if processing terminates 624, or repeats for the next array stripe.

By using lock management for accessing disks in an array as exemplified above, hosts may share access to disk arrays having RAID groups despite private communication links to processing nodes. The processing nodes may be host bus adapters, internal nodes built into a computer or other equivalent construction. The lock manager and storage algorithms may be distributed among each of the processing nodes in connection to the network. With shared access to the RAID groups, it is easy to add a host to a network by adding a processing node having the lock manager and RAID storage algorithms.

Although the invention has been described with reference to several preferred embodiments, it will be understood by one of ordinary skill in the art that various modifications may be made without departing from the spirit and the scope of the invention, as set forth in the claims hereinbelow.

We claim:

1. A data storage system comprising:
   at least three data storage disks, each of said disks having a plurality of data storage sectors wherein said at least three data storage disks store data according to a protocol that forms stripes, each stripe including a plurality of data storage sectors, each of the data storage sectors in the stripe being on a different one of said data storage disks wherein one of the data storage sectors in the stripe stores parity data so that in the event that one of said different data storage disks fails, the data of said failed disk can be reconstructed from the data in the sectors of the stripe in the other of the data storage disks;
   a plurality of processing nodes in communication with said at least three data storage disks, each processing node sharing access to said at least three data storage disks, and each of said processing nodes including a distributed lock manager to allow or deny access to selected stripes of data storage sectors on any of said at least three data storage disks; and
   each of said processing nodes including an interface to a private communication link to a single one of a plurality of host operating systems.

2. The data storage system of claim 1 wherein said plurality of processing nodes are in communication with each other.

3. The data storage system of claim 1 wherein each distributed lock manager includes means for acquiring a lock associated with a stripe and the means for acquiring a lock includes means for awaiting release of a lock on said stripe imposed by an other of said processing nodes.

4. The data storage system of claim 1 wherein at least one of said processing nodes comprises a host-bus adapter.

5. The data storage system of claim 1 further comprising a host computer housing one of said host operating systems and at least one of said processing nodes.

6. The data storage system of claim 1 further comprising a dual loop Fibre Channel connecting said plurality of processing nodes and said at least three data storage disks.

7. The data storage system of claim 1 wherein said at least three data storage disks comprise programmable XOR drives.

8. The data storage system of claim 1 wherein each distributed lock manager includes means for asserting a NULL request for maintaining a reference to the stripe of data storage sectors without blocking other lock requests to such sectors.

9. The data storage system of claim 1 wherein each distributed lock manager includes means for asserting an unprotected read lock type of lock request for allowing nonexclusive read or write access to the stripe of data storage sectors so as to block exclusive lock requests.

10. The data storage system of claim 1 wherein each distributed lock manager includes means for asserting an unprotected write lock type of lock request for allowing nonexclusive read or write access to the stripe of data storage sectors while blocking protected and exclusive lock requests for such sectors.

11. The data storage system of claim 1 wherein each distributed lock manager includes means for asserting a protected read lock type of lock request for allowing non-exclusive read access to the stripe of data storage sectors while blocking write access and exclusive lock requests to such sectors.

12. The data storage system of claim 1 wherein each distributed lock manager includes means for asserting a protected write lock type of lock request for allowing concurrent unprotected read accesses to the stripe of data storage sectors while blocking all other lock requests.

13. The data storage system of claim 1 wherein each distributed lock manager includes means for asserting an exclusive lock type of lock request for obtaining exclusive access to the stripe of data storage sectors while blocking all other lock requests for such sectors.

14. The data storage system of claim 1 wherein each processing node further includes means for determining whether an operation on a designated sector of a designated disk has been prevented by a lock issued by any of said processing nodes with respect to the designated sector in the designated disk; and means for awaiting release of such a lock before performing the operation on the designated sector.

15. The data storage system of claim 1 wherein said pluarlity of processing nodes comprises at least three processing nodes.

16. A method of providing each of a plurality of host operating systems access to each of a plurality of data storage disks having data stored therein according to a protocol so that in the event that one of said disks fails, the data in said failed disk can be reconstructed from the data in other ones of said disks, said method comprising:
   providing a plurality of processing nodes each having a distributed lock manager and each in communication with each of the plurality of data storage disks;
   providing a private communication link between each of said processing nodes and one of said host operating systems;
   communicating over one of the private communication links between one of said host operating systems and one of the processing nodes;
   acquiring a shared lock encompassing a stripe extending across at least three of said data storage disks;
   writing new data into a selected sector in the stripe on one of said at least three data storage disks;
   updating a parity sector in the stripe on another of said at least three data storage disks; and
   releasing the shared lock.

17. The method of claim 16 wherein the shared lock extends over the entirety of each of said at least three data storage disks.

18. A data storage system comprising:
- at least three data storage disks, each of said disks having a plurality of data storage sectors wherein said at least three data storage disks store data according to a protocol that forms stripes, each stripe including a plurality of data storage sectors, each of the data storage sectors in the stripe being on a different one of said data storage disks wherein one of the data storage sectors in the stripe stores parity data so that in the event that one of said different data storage disks fails, the data of said failed disk can be reconstructed from the data in the sectors of the stripe in the other of the data storage disks;
- a plurality of processing nodes in communication with said at least three data storage disks, each of said processing nodes having a multi-leveled distributed lock manager to allow or deny access to selected stripes on the data storage sectors of any of said data storage disks; and
- each of said processing nodes including an interface to a private communication link to a single one of a plurality of host operating systems.

19. The data storage system of claim 18, wherein the multi-level lock manager includes means for asserting a NULL request for maintaining a reference to the stripe of data storage sectors without blocking other lock requests to such sectors.

20. The data storage system of claim 18, wherein the multi-level lock manger includes means for asserting an unprotected read lock type of lock request for allowing nonexclusive read or write access to the stripe of data storage sectors so as to block exclusive lock requests.

21. The data storage system of claim 18, wherein the multi-level lock manager includes means for asserting an unprotected write lock type of lock request for allowing nonexclusive read or write access to the stripe of data storage sectors while blocking protected and exclusive lock requests for such sectors.

22. The data storage system of claim 18, wherein the multi-level lock manager includes means for asserting a protected read lock type of lock request for allowing non-exclusive read access to the stripe of data storage sectors while blocking write access and exclusive lock requests to such sectors.

23. The data storage system of claim 18, wherein the multi-level lock manager includes means for asserting a protected write lock type of lock request for allowing concurrent unprotected read accesses to the stripe of data storage sectors while blocking all other lock requests.

24. The data storage system of claim 18, wherein the multi-level lock manager includes means for asserting an exclusive lock type of lock request for obtaining exclusive access to the stripe of data storage sectors while blocking all other lock requests for such sectors.

\* \* \* \* \*